United States Patent [19]

Spanoudis

[11] 4,277,013
[45] Jul. 7, 1981

[54] METHOD FOR BRAZE-ASSEMBLING METAL COMPONENTS HAVING LOW SOFTENING TEMPERATURES, WITHOUT DISRUPTING REGIONS OF STABILIZED DIMENSIONS

[75] Inventor: Louis Spanoudis, Toledo, Ohio

[73] Assignee: Owens-Illinois, Inc., Toledo, Ohio

[21] Appl. No.: 67,638

[22] Filed: Aug. 17, 1979

[51] Int. Cl.³ .............................................. B23K 31/00
[52] U.S. Cl. .................................... 228/136; 228/183; 228/226
[58] Field of Search ................ 228/136, 137, 178, 183, 228/222, 242, 249, 173 F

[56] References Cited

U.S. PATENT DOCUMENTS

| 1,703,037 | 2/1929 | Heck ..................................... 228/136 |
| 2,768,596 | 10/1956 | Kalbow et al. ................... 228/222 X |
| 2,779,998 | 2/1957 | Bailey .............................. 228/136 X |

FOREIGN PATENT DOCUMENTS 46-13811  4/1971  Japan ........................................ 228/222

Primary Examiner—Richard B. Lazarus
Attorney, Agent, or Firm—John R. Nelson; Myron E. Click; David H. Wilson

[57] ABSTRACT

A method for braze-assembling metal components having low softening temperatures is provided, whereby selective cooling of specific regions of stabilized dimensions with the aid of heat sinks prevents softening of the metal components at and proximal to the specific regions of stabilized dimensions.

3 Claims, 12 Drawing Figures

METHOD FOR BRAZE-ASSEMBLING METAL COMPONENTS HAVING LOW SOFTENING TEMPERATURES, WITHOUT DISRUPTING REGIONS OF STABILIZED DIMENSIONS

BACKGROUND OF THE INVENTION

This invention relates to a method of brazing metal components of low softening temperature to form an assembly, by selectively cooling specific regions of the metal components requiring stabilized configurations during and subsequent to brazing, and to prevent softening and distortion of such specific regions.

More specifically, the invention relates to a method of braze assembling a series of upper and lower cups and connecting tubes, each of which is fabricated from a metal having a low softening temperature, such as copper. Each of the cups has a stepped wall and an annular ring groove for retaining an elastomeric O-ring, upon which a glass tube is seated to provide a tight seal between the glass tube and the metal cup.

Because of the specific nature of the metal components, i.e., having a low softening temperature, a soft solder was heretofore used to join the component copper parts. One of the soft solders employed is identified as Welco No. 5, which comprises 96.5% tin and 3.5% silver, in order to prevent distortion of the specific regions on the metal components. But when the assembled metal components forming series-units were put into use, as elements in a solar collection system, the solder melted out from the joints when a "failure condition" arose in the system employing the units, whereby liquids passing through the units became superheated. To overcome the problem of the solder melting out under a "failure condition", a silver brazing material, either a non-fluxing material or a self-fluxing material was used to obtain a braze that would withstand a "failure condition" in the system employing the units. As anticipated, another problem arose regarding the brazing operation whereby the specific regions requiring dimensional stability became softened and thereby were easily distorted by the heating or by handling during the sealing operation, so that the softening of the metal adversely affected the seal between the glass tubes and the cups.

SUMMARY OF THE INVENTION

The present invention, however, uses a relatively high melting temperature brazing material but employs specifically designed heat sinks to selectively cool the specific regions requiring dimensional stability of the metal components, for example, the cups, and thereby no softening or distortion of the specific regions occurs. The heat sinks are of a heat abosrbent or heat conducting material and of a thickness to sufficiently dissipate heat to protect the specific regions requiring dimensional stability. These heat sinks are easily assembled to and removed from the metal components prior to and after the brazing operation. One advantage then of the present invention is that a braze of high temperature material is employed without damaging the specific regions requiring dimensional stability, whereby the units can withstand "failure conditions" arising in systems employing the units, so that specific areas, such as the seal between the glass tubes and the cups are not adversely affected.

The present invention has proven to be well suited to braze assembling of metals having low softening temperatures, particularly copper, such as No. 122-copper stock, without deteriorating specific regions requiring dimensional stability during the heating step of the brazing operation. It is also useful in the brazing of high heat conductivity metal components.

It is therefore an object of the present invention to provide a method of using high temp brazing material on low softening temperature metals, such as copper, without softening and distortion of specific regions requiring dimensional stability.

It is another object of the present invention to provide a method of silver braze-assembling component metals of low softening temperatures into individual units for subsequent joining into a desired order, without softening specific regions requiring dimensional stability.

It is yet another object to provide a method of silver braze-assembling component metals of low softening temperatures, in situ, to obtain units arranged in a desired order, and through the use of heat sinks, to selectively cool specific regions requiring dimensional stability during and subsequent to the brazing operation.

This invention makes possible the manufacture of manifolds for modules used in solar collection systems, especially those described in U.S. Pat. No. 4,033,327.

According to the present invention, the silver brazing material can be employed to join component metal parts of low softening temperatures, to form a unit, without deforming specific regions requiring dimensional stability, to ensure that the brazed junctures remain intact under "failure conditions" when the units are in use in the solar collector system.

One essential feature of the present invention is the use of heat sinks to selectively cool specific regions of the component metal parts requiring dimensional stability in specific regions, during and subsequent to heating portions of the metal parts substantially beyond the softening temperature of the metal parts, thus permitting the use of high temperature brazes, such a silver brazes.

Another essential feature of the present invention is that the heat sinks are easily positioned on, and removed from the component parts to enable one to form a unit alone, or a group of units arranged in a desired order, in situ.

DESCRIPTION OF THE PREFERRED EMBODIMENT

The method of this invention finds particular utility in the brazing of copper or copper alloy components employed in a solar energy collector module of the type shown in U.S. Pat. No. 4,033,327 to Y. K. Pei. Such solar collection system employs a plurality of glass tubes, the ends of which are sealingly mounted within hollow, cup shaped copper elements, which are brazed together in back-to-back relationship and are also interconnected to other brazed units by so called cross-over tubes, the ends of which are respectively brazed in suitable apertures in the sidewalls of the cup shaped members. In such construction, it is important that the glass engaging areas of the cups maintain a prescribed dimensional configuration in order to insure that a proper seal is obtained with the cooperating glass tube. At the same time, the connection between the two cups, as well as the connections between the cross-over tubes and the individual cups, must be capable of maintaining a fluid seal under temperature conditions that occasionally exceed the melting temperature of conventional copper solders. These requirements indicate the necessity for effecting brazed connections of the copper cups and the connecting tubes with a brazing material that has a melting temperature in excess of the softening temperature of the copper alloy from which the cups and connecting tubes are fabricated. Therefore, it becomes crucial that the brazing operation be accomplished without any significant distortion of the glass tube engaging portions of the cups, despite the fact that other portions of the cups will be exposed to temperatures in the brazing operation which are in excess of the softening point of copper.

Figure 1:
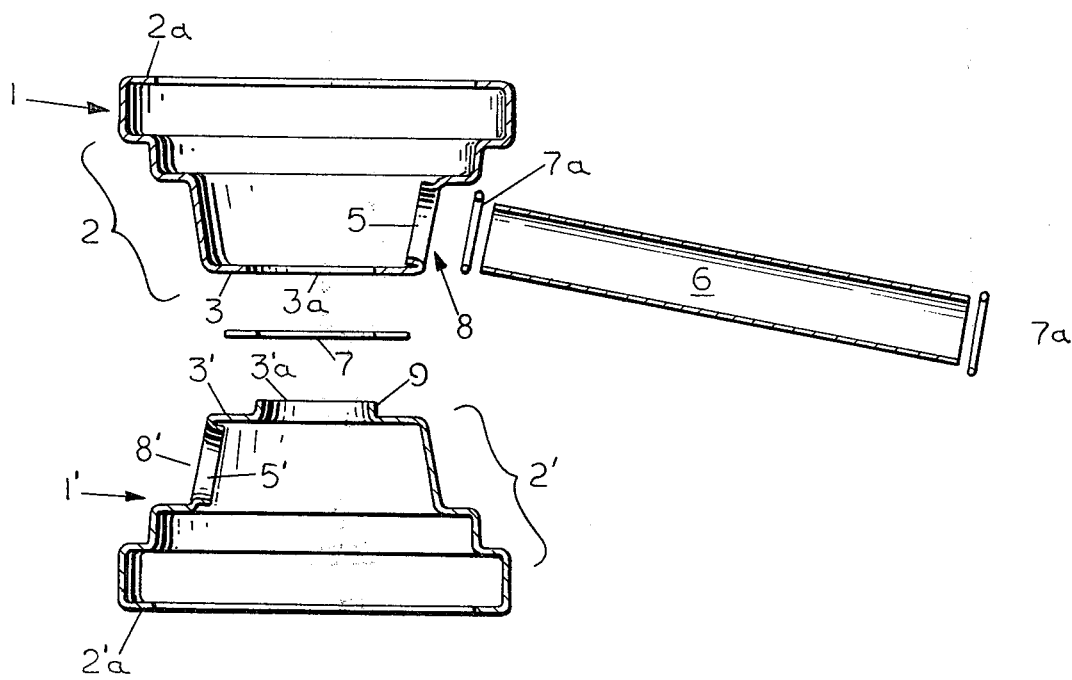
FIG. 1 is an exploded vertical sectional view of component parts to be brazed and performed brazing materials.
Figure 3:
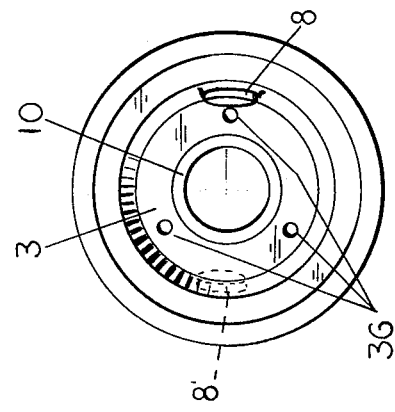
FIG. 3 is a plan view of two joined components.

Referring to FIG. 1, the copper cups 1 and 1' are shown in exploded relationship to each other and to a connecting tube 6. Each cup provided with an annular, outwardly flared and stepped wall portion 2 and 2' respectively terminating in a flange 2a and 2'a defining an annular recess for reception of an elastomeric gasket (not shown) for engaging the end of a glass tube in sealing relationship. The base portions or end walls 3 and 3', respectively of cups 1 and 1' each define a central opening 3a and 3'a. The cup 1' has an axially extending flange 9 adjacent central opening 3'a, such flange being adapted to pass through the annular opening 3a of cup 1 and then to be crimped to a radial configuration 10 (see FIG. 2) to fix the position of the cups 1 and 1' relative to each other prior to brazing.

The cups 1 and 1' are provided with side wall apertures 8 and 8' having inwardly extending flanges 5 and 5' to snugly receive the end of a connecting or cross-over tube 6. Prior to the crimping operation, a preformed ring of self-fluxing silver brazing material 7 is slipped over the axially projecting flange 9, and a preformed ring of silver brazing material 7a is slipped over the end of the cross-over tube 6, immediately adjacent to the side wall of the cup 1.

Figure 2:
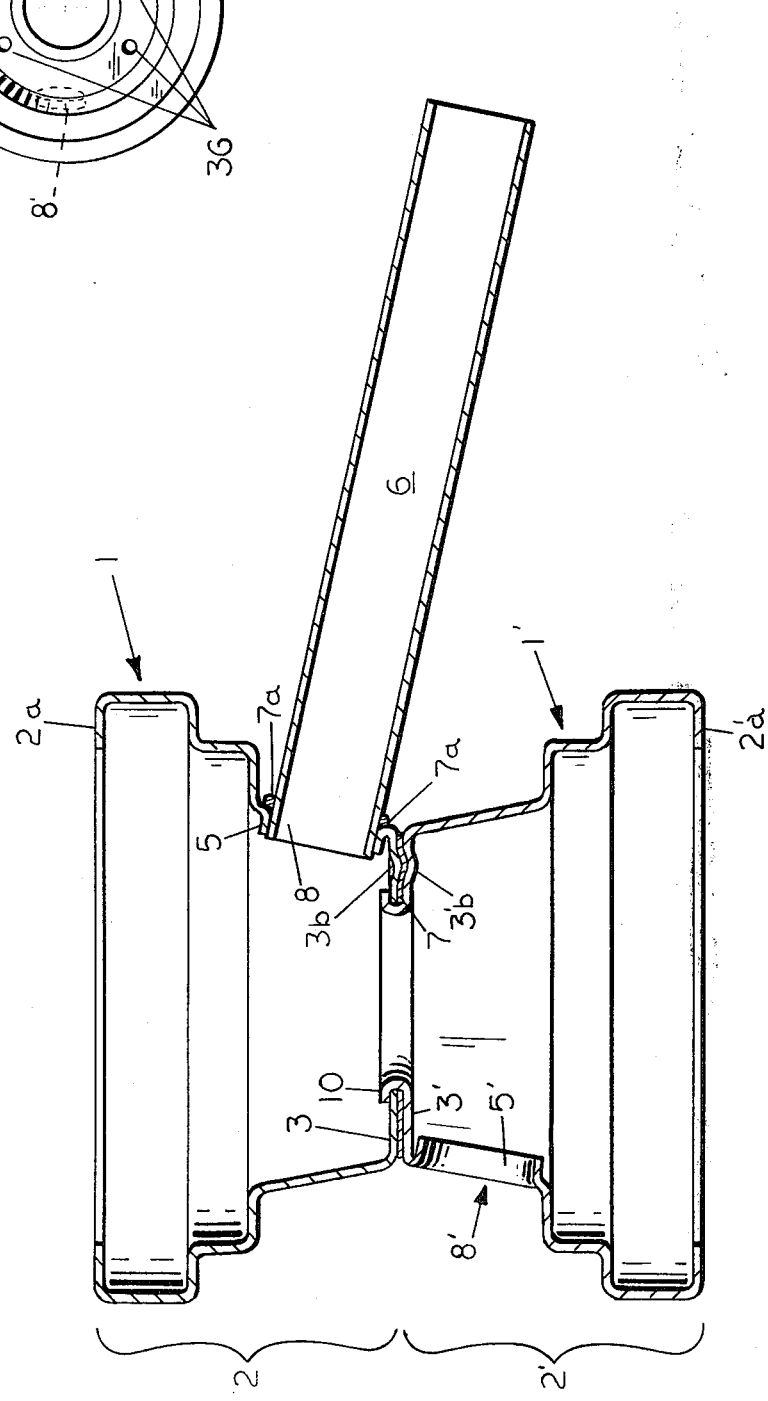
FIG. 2 is a vertical sectional view of component parts joined to form a unit.

Referring to FIG. 2, the copper cups 1, 1' and tube 6 are shown in a mechanically joined relationship. Connecting tube 6 is inserted into side wall aperture 8 of cup 1, whereby inwardly extending flange 5 engages tube 6. The crimped flange 10 snugly engages end walls 3, 3' of cups 1, 1' together, with the preform of self-fluxing silver brazing material 7, therebetween.

During the crimping operation, one or more depressions or dimples 3b and 3'b are formed in end walls 3a and 3'a respectively to prevent relative rotational movement of the cups 1 and 1' during the brazing operation, and to maintain side wall apertures 8 and 8' in a 180° relationship during subsequent handling and brazing.

In order to perform the brazing operation without any significant distortion to the regions of the cups requiring dimensional stability, specifically those portions 2a, 2'a of the cups 1, 1' which engage the ends of glass tubes of a solar collector system, heat sinks are employed to quickly dissipate heat from such regions.

Figure 4:
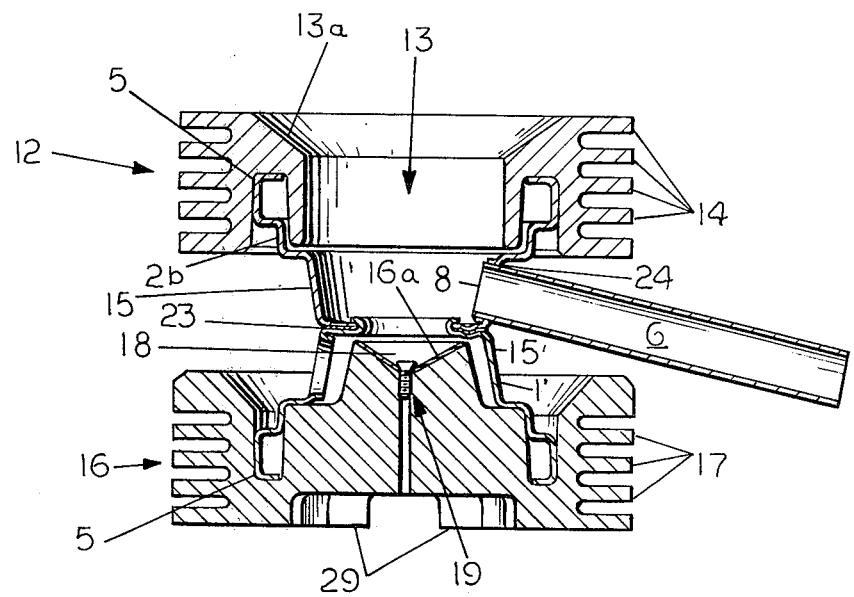
FIG. 4 is a vertical sectional view of components positioned for brazing with upper and lower heat sinks engaging the components.

Referring to FIG. 4, an upper heat sink 12 and a lower heat sink 16 are shown engaged about the glass tube engaging portions 2a, 2'a of cups 1, 1'. The heat sinks 12, 16 have internal surfaces generally conforming to the regions 2a, 2'a and portions of the stepped side walls 2, 2' of cups 1, 1'. The exterior surfaces of heat sinks 12 and 16 are provided with heat dissipating fins 14 and 17 respectively. The heat sinks 12, 16 are constructed from a high heat conducting material such as copper or brass, and are of a generally massive thickness as compared to the object being heated, to quickly absorb heat from the regions of the cups 1 and 1' requiring dimensional stability. The heat sinks are readily positioned about the cups, and, after the brazing operation, which comprises 3–7 seconds per braze joint, the same may be removed and reused, either upon the joining of the formed units into a composite or upon a different group of components.

Figure 5:
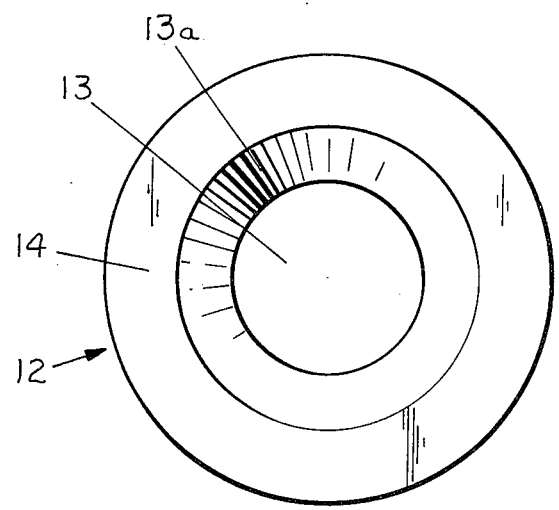
FIG. 5 is a plan view of the upper heat sink.
Figure 6:
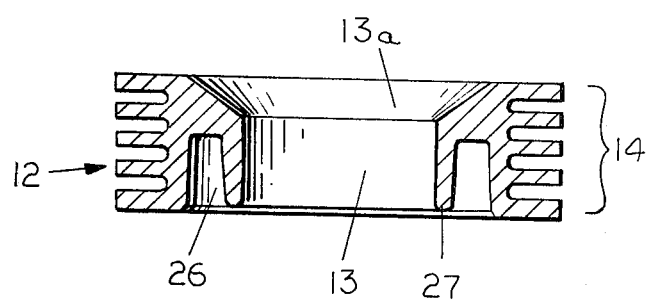
FIG. 6 is a vertical sectional view of the upper heat sink.
Figure 7:
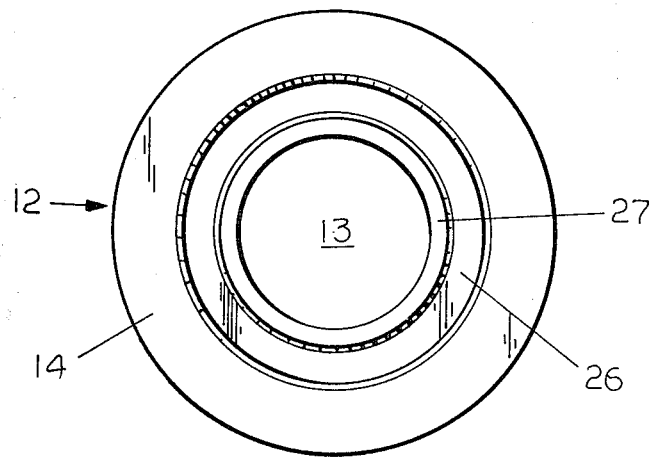
FIG. 7 is a bottom view of the upper heat sink.

Referring to FIGS. 5, 6 and 7, a conical recessed area 13a is provided in the upper most portion of the upper heat sink 12, and is adjacent to a central aperture 13 passing axially through the upper heat sink 12. This facilitates the application of the brazing flame to only the braze juncture areas of the container cup. Cavity 26 in the bottom surface of the upper heat sink 12 engages flange area 2a and portions of sidewall 2 of cup 1. A circular rib 27 extends downwardly to engage the internal surface of an axial portion 2b of sidewall 2 of cup 1.

Figure 8:
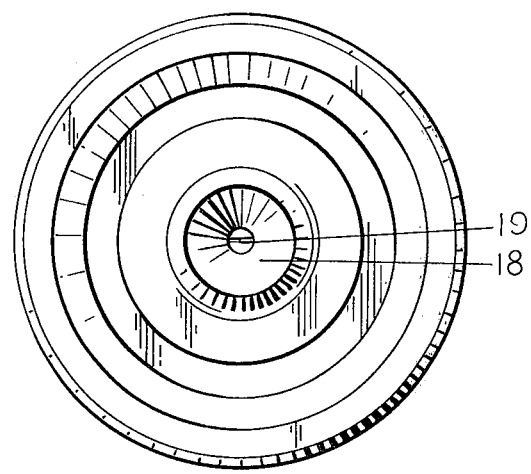
FIG. 8 is a plan view of the lower heat sink.
Figure 9:
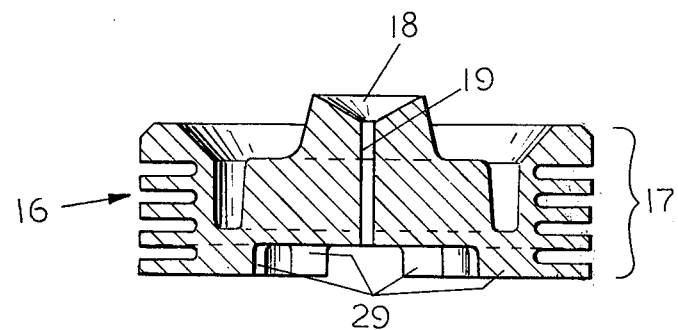
FIG. 9 is a vertical sectional view of the lower heat sink.
Figure 10:
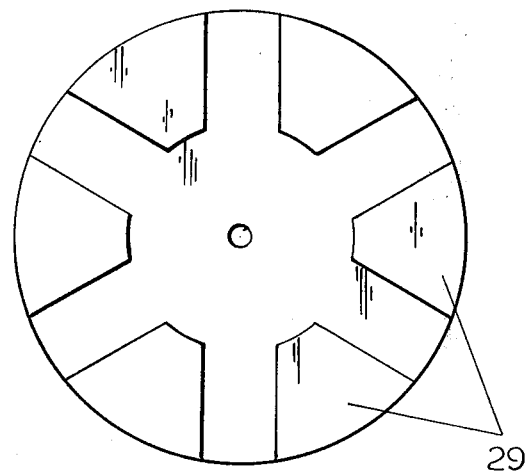
FIG. 10 is a bottom view of the lower heat sink.
Figure 11:
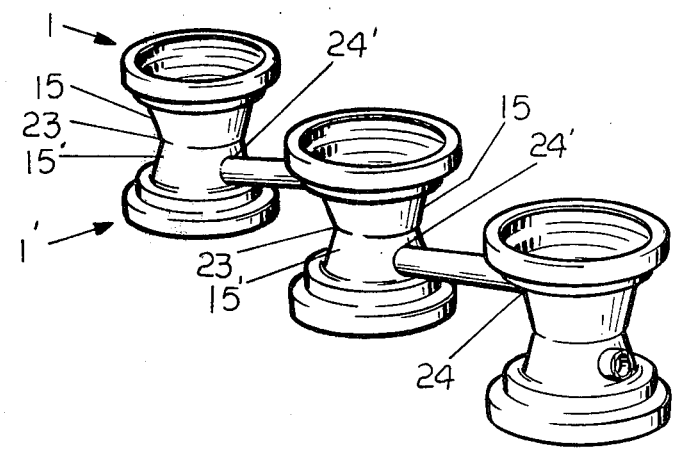
FIG. 11 is a perspective view of aligned parts which have been braze-assembled.
Figure 12:
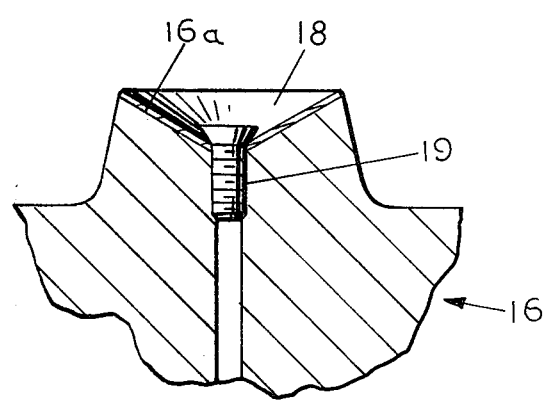
FIG. 12 is a partial vertical sectional view of the reflector means of the lower heat sink.

Referring to FIGS. 8, 9, 10, lower heat sink 16 is provided with a reflector 18 mounted on the conical upper portion 16a of the heat sink 16 and is secured thereto by bolt 19 to facilitate the reflection of heat upwardly to the brazing area. The bottom surface of the lower heat sink has a plurality of circumferentially spaced depending lugs 29. The lugs 29 serve to aid in placement and fixation of the lower heat sink on a support fixture (not shown).

The mechanically joined cups 1, 1' and the tube 6, with heat sinks 12 and 16 applied thereto, are then subjected to a brazing flame only at the areas to be brazed, the brazing flame being formed by regulating cylinder pressures to about 7 psi for propane and 14 psi for oxygen. The brazing flame is generally applied in an orbital motion to the areas to be brazed and preferably the brazing flame is directed to that side of the metal component which is not in engagement with the brazing material, such as the flange 5 or 10, so that capillary action pulls the melted braze through the joint to insure a good braze.

The first brazing operation secures cups 1, 1' together and one end of tube 6 to side wall flange 5 to form a unit. In order to join the units, to form the assemblage of FIG. 9, the units must be rotated 180°, and then cup 1 is positioned in the lower heat sink 16 and cup 1' can receive upper heat sink 12, thus allowing the brazing flame access to the second braze joint area comprising the other end of tube 6 and side wall flange 5' of cup 1'. The resulting assembly after brazing, with the heat sinks removed, appears as shown in FIG. 9. The assembly, as shown, is a linear configuration, but other configurations are feasible, such as a zig-zag configuration.

During the brazing operation, temperatures in excess of the softening point of the metal components are imparted to the braze juncture areas, generally temperatures of about 1150° F. to 1300° F., thus softening the copper or copper alloy in the immediate areas where the braze flame is directed. Transition areas 15, 15' on the side walls of cups 1, 1' adjacent the braze juncture areas 23 and 24, 24' develop some softening, but the regions requiring dimensional stability, such as flanges 2a and 2'a, do not develop any softening or disfigurement during and subsequent to brazing.

Modifications of the disclosed method may be resorted to without departing from the spirit and scope of the appended claims.

What is claimed is:

1. A method of braze assembling cup shaped copper alloy components with the end walls of the cups being disposed in abutting relationship, each of said end walls having a central aperture, and one of said cups having an axial flange surrounding the central aperture comprising the steps of: placing a ring-shaped preform of brazing material around the axial flange, inserting the axial flange in the central aperture of the other cup and crimping the end portion of said flange over the periphery of the aperture in the other cup to retain the cups in assembly with said preform therebetween, placing heat sinks around the side wall regions of each of said cups requiring stabilized dimensions, flame heating only the inner end wall areas of said uppermost cup to melt said preform and effect the brazing of the cups together, and removing the heat sinks, whereby the side wall regions surrounded by said heat sinks are maintained in their original configuration during and subsequent to heating.

2. A method of high temperature brazing a plurality of cups and tubes to form units and a composite of units, in situ, said cups being formed from a low softening temperature metal, having a tube receiving aperture and having regions requiring stabilized dimensions, comprising the steps of: placing preforms of brazing material between the butt ends of the cups which are to be joined to form units and on the ends of the tubes; mechanically securing the butt ends of the cups together; inserting the tubes through the apertures in the cups: placing heat sinks over the regions of each cup requiring stabilized dimensions; sequentially heating only the areas to be brazed sufficiently to melt the preforms and to soften the metal at substantially only the areas to be brazed, and removing the heat sinks, whereby said regions requiring stabilized dimensions are maintained in their original configuration.

3. A method of braze-assembling a plurality of composite units, each unit comprising a pair of cups disposed in back to back relationship, each cup having a side wall aperture, and a connector tube inserted in a side wall aperture of one of the cups, said cups and tubes being formed of a metal having a low softening temperature and said cups having regions thereof requiring stabilized dimensions, said method comprising the steps of:

(1) mechanically joining the cups in back to back relationship with a preform of brazing material disposed therebetween, inserting a tube in the side wall aperture of one cup together with a preform brazing material, thus forming a mechanically assembled unit;

(2) positioning a plurality of said units in aligned lower heat sink members with the stabilized dimensional regions of the lower cup disposed in the heat sink and the free end of the tube of each unit engaging the side wall aperture of the lower cup of the adjacent unit;

(3) placing upper heat sink members around the stabilized dimensional regions of each of the upper cups;

(4) directing a brazing flame to only the braze juncture areas in the upper cups to obtain brazed joints;

(5) removing the upper heat sink members;

(6) removing the assembly of units from the lower heat sink members;

(7) rotating the unit assembly 180° about its longitudinal axis and reinserting the previously upper cup members into the lower heat sink members;

(8) placing the upper heat sink members onto the previously lower cups of the assembly;

(9) directing a brazing flame to only the braze juncture areas in the previously lower cups to obtain brazed joints therein, and

(10) removing the upper heat sink members from the assembly and removing the assembly from the lower heat sink members.

* * * * *